US006943460B2

(12) United States Patent
Wakashiro et al.

(10) Patent No.: US 6,943,460 B2
(45) Date of Patent: Sep. 13, 2005

(54) CONTROL DEVICE FOR HYBRID VEHICLE

(75) Inventors: Teruo Wakashiro, Shioya-gun (JP);
Kohei Hanada, Utsunomiya (JP);
Takahiro Yonekura, Utsunomiya (JP);
Makoto Kishida, Frankfurt (DE);
Tomohiro Nishi, Kawachi-gun (JP);
Kazuhiro Hara, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 168 days.

(21) Appl. No.: 10/617,749

(22) Filed: Jul. 14, 2003

(65) Prior Publication Data

US 2004/0012206 A1 Jan. 22, 2004

(30) Foreign Application Priority Data

Jul. 16, 2002 (JP) .......................................... 2002-207223

(51) Int. Cl.⁷ .................. B60K 6/00; B60K 1/00; B60K 6/02; F02N 11/06; H02P 9/04
(52) U.S. Cl. .................. 290/40 C; 290/9; 290/16; 290/17; 290/18; 180/65.2
(58) Field of Search ................. 290/9, 16–18, 290/40 C; 180/65.1–65.8

(56) References Cited

U.S. PATENT DOCUMENTS

| | | | | |
|---|---|---|---|---|
| 5,867,009 A | * | 2/1999 | Kiuchi et al. .................. 322/16 |
| 6,408,968 B1 | | 6/2002 | Wakashiro et al. ......... 180/65.3 |
| 6,516,254 B1 | * | 2/2003 | Wakashiro et al. ............ 701/22 |
| 6,583,592 B2 | * | 6/2003 | Omata et al. ................ 318/139 |
| 6,621,244 B1 | * | 9/2003 | Kiyomiya et al. ........... 318/611 |
| 6,630,810 B2 | * | 10/2003 | Takemasa et al. .......... 320/104 |
| 6,687,581 B2 | * | 2/2004 | Deguchi et al. .............. 701/22 |
| 6,687,603 B2 | * | 2/2004 | Wakashiro et al. ......... 701/110 |
| 6,691,807 B1 | * | 2/2004 | Bhavsar et al. ............ 180/65.2 |
| 6,694,232 B2 | * | 2/2004 | Saito et al. .................... 701/22 |
| 6,702,052 B1 | * | 3/2004 | Wakashiro et al. ........ 180/65.2 |
| 6,727,676 B2 | * | 4/2004 | Ochiai ......................... 320/104 |
| 6,756,758 B2 | * | 6/2004 | Karikomi et al. ........... 318/434 |
| 6,820,706 B2 | * | 11/2004 | Ovshinsky et al. ........ 180/65.1 |
| 6,835,160 B2 | * | 12/2004 | Kitano et al. ................... 477/5 |
| 6,837,320 B2 | * | 1/2005 | Wakashiro et al. ........ 180/65.2 |

FOREIGN PATENT DOCUMENTS

| | | | |
|---|---|---|---|
| EP | 1128 044 A2 | 8/2001 | |
| EP | 1232894 A2 * | 8/2002 | ............ B60K/6/04 |
| EP | 1388450 A2 * | 2/2004 | ............ B60K/6/04 |
| JP | 2001-057709 | 2/2001 | ..................... 11/14 |
| JP | 2002-70599 | 3/2002 | ....................... 70/2 |

OTHER PUBLICATIONS

International Publication No. WO 02/04806 A1, published Jan. 17, 2002.

* cited by examiner

*Primary Examiner*—Darren Schuberg
*Assistant Examiner*—Pedro J. Cuevas
(74) *Attorney, Agent, or Firm*—Arent Fox, PLLC

(57) ABSTRACT

A control device for a hybrid vehicle, the hybrid vehicle comprising an engine and a motor as power sources, the control device including: a battery device sending energy to and receiving energy from the motor, a temperature sensor for measuring the temperature of the battery device; a control section which is adapted to execute a warming control operation for the battery device when the temperature of the battery device is low; and a determination section for determining whether a cylinder deactivation operation is permitted for the engine depending on the running state of the engine. The control section executes a vibration control operation for the engine by operating the motor so as to reduce vibration of the engine when it is determined by the determination section that the partial cylinder deactivation operation is permitted for the engine, and to perform the warming control operation for the battery device by executing a vibration control operation for the engine.

7 Claims, 9 Drawing Sheets

CONTROL DEVICE FOR HYBRID VEHICLE

BACKGROUND OF THE INVENTION

1. Field of the Invention

The present invention relates to a control device for a hybrid vehicle that includes an engine, which is adapted to allow a partial cylinder deactivation operation, and in particular, the present invention provides a control device for a hybrid vehicle which enables warming of a battery device when the vehicle is either in a partial cylinder deactivation state or in an all-cylinder operation state.

2. Description of the Related Art

As disclosed in, for example, Japanese Unexamined Patent Application, First Publication No. 2001-57709, an engine control device is known which performs warming of a battery when the vehicle runs in a cruise mode and when at least one of the temperature of the battery and the temperature of engine cooling water does not reach a predetermined temperature, in such a manner that the engine control device increases the amount of power generation during the cruise mode and continues charging into the battery until a time at which both the temperature of the battery and the temperature of engine cooling water reach the predetermined temperature. In this vehicle, when it is determined that the battery cannot accept any more charging energy, a vibration control is executed by operating a motor so as to generate electrical power or so as to assist power of the engine so that periodic variation in driving power of the engine is restrained, and thereby vibration of the vehicle due to variation in driving power of the engine is restrained.

However, in such a conventional control process described above, a problem is encountered in that a load applied to the engine is increased, and thereby fuel economy is degraded because warming the battery is performed by charging the battery by power generation.

In recent years, a type of hybrid vehicle is also known which employs a cylinder deactivation technique in order to further improve fuel economy. In this technique, when the hybrid vehicle runs in a decelerating state and fuel supply is suspended so as to place cylinders of the engine in a non-burn state, intake valves and exhaust valves of some of the cylinders are maintained to be closed so that friction losses in the deactivated cylinders are reduced, the amount of power generation is increased by an amount corresponding to reduced friction loss so that the amount of energy charged into the battery is increased, and the increased electrical energy is used for operating the motor so that a load on the engine is reduced, and thereby fuel economy is improved.

However, when the above-mentioned warming control for a battery is applied to the hybrid vehicle which allows execution of a cylinder deactivation operation, because a load applied to the engine is increased during power generation in the cylinder deactivation state, an all-cylinder operation must be resumed by canceling the cylinder deactivation operation; therefore, a problem is encountered in that frequency of executions of cylinder deactivation operation is reduced, and fuel economy is not improved. In addition, because an energy management is employed, in which frequency of power generation operations is increased under a low temperature condition than under a normal temperature condition, when, for example, the battery is maintained in a substantially fully charged state, and when a state of charge of the battery reaches an upper limit while the vehicle runs on a down slope, a regeneration operation is restrained, and thereby energy corresponding to restriction of regeneration cannot be recovered, and the energy is lost.

SUMMARY OF THE INVENTION

In view of the above circumstances, an object of the present invention is to provide a control device for a hybrid vehicle which enables making both a cylinder deactivation control and a warming control for a battery device effective without sacrificing one or the other.

In order to achieve the above object, the present invention provides a control device for a hybrid vehicle, the hybrid vehicle comprising an engine, which is adapted to allow a partial cylinder deactivation operation, a motor, which is capable of power generation, and driving wheels, the output power of at least one of the engine and the motor being transmitted to the driving wheels for driving the hybrid vehicle; the control device including: a battery device sending energy to and receiving energy from the motor, a temperature measuring section for measuring the temperature of the battery device; a control section which is adapted to execute a warming control operation for the battery device when the temperature of the battery device measured by the temperature measuring section is equal to or lower than a first predetermined value; and a determination section for determining whether the partial cylinder deactivation operation is permitted for the engine depending on the running state of the engine, wherein the control section is further adapted to execute a vibration control operation for the engine by operating the motor so as to reduce vibration of the engine when it is determined by the determination section that the partial cylinder deactivation operation is permitted for the engine, and to perform the warming control operation for the battery device by executing a vibration control operation for the engine.

According to the control device for a hybrid vehicle configured as described above, when the temperature of the battery device is equal to or lower than the first predetermined value and the cylinder deactivation operation is being executed, the motor is operated so as to compensate for dynamic imbalance of the engine due to the cylinder deactivation operation, so as to reduce vibration of the engine, whereby it is possible to warm the battery device using Joule heat which is generated during outputting electrical energy from the battery device due to the internal resistance of the battery device.

In the above control device for a hybrid vehicle, the warming control operation for the battery device by executing vibration control operation for the engine may be performed only in the case in which a state of charge of the battery device is greater than a predetermined value, and the temperature of the battery device is higher than a second predetermined value.

According to the control device for a hybrid vehicle configured as described above, the warming control operation for the battery device by executing vibration control operation is performed only when the battery device is charged to some extent, i.e., when the battery device does not require an urgent charging, and when the temperature of the battery device is not too low.

In the above control device for a hybrid vehicle, the control section may be further adapted to operate the engine in an all-cylinder operation state when it is determined by the determination section that the partial cylinder deactivation operation is not permitted for the engine, and to perform the warming control operation for the battery device by charging the battery device with electrical energy generated by the motor.

According to the control device for a hybrid vehicle configured as described above, power generation is performed when the engine runs in the all-cylinder operation state, i.e., when the engine can sustain a considerable magnitude of load, whereby the battery device can be warmed using Joule heat which is generated during charging of the generated electrical energy into the battery device due to the internal resistance of the battery device.

In the above control device for a hybrid vehicle, the determination section may be adapted to determine whether the partial cylinder deactivation operation is permitted for the engine depending on one of the parameters including the temperature of cooling water of the engine, a state of charge of the battery device, and the temperature of the battery device.

According to the control device for a hybrid vehicle configured as described above, determination as to whether the partial cylinder deactivation operation is permitted for the engine may be precisely made by referring to one of the parameters including the temperature of cooling water of the engine, a state of charge of the battery device, and the temperature of the battery device.

In the above control device for a hybrid vehicle, the determination section may be adapted to determine whether the partial cylinder deactivation operation is permitted for the engine while containing a threshold value which is determined by a depression amount of the accelerator pedal and the vehicle speed.

According to the control device for a hybrid vehicle configured as described above, the battery device may be warmed while taking into account the vehicle running state that is determined by the depression amount of the accelerator pedal and the vehicle speed.

In the above control device for a hybrid vehicle, when it is determined that the partial cylinder deactivation operation is permitted, and when the warming control operation for the battery device is performed by executing the vibration control operation, an amplitude for the vibration control operation may be differently set depending on the temperature of the battery device.

Furthermore, a greater amplitude for the vibration control operation may be set when a greater increase in the temperature of the battery device is required.

According to the control device for a hybrid vehicle configured as described above, based on the fact that the amount of energy output from the battery device is increased when a greater amplitude for the vibration control operation is set, an optimum amplitude for the vibration control may be set depending on the temperature of the battery device to be warmed.

DESCRIPTION OF THE PREFERRED EMBODIMENTS

An embodiment of the present invention will be explained below with reference to appended drawings.

Figure 1:
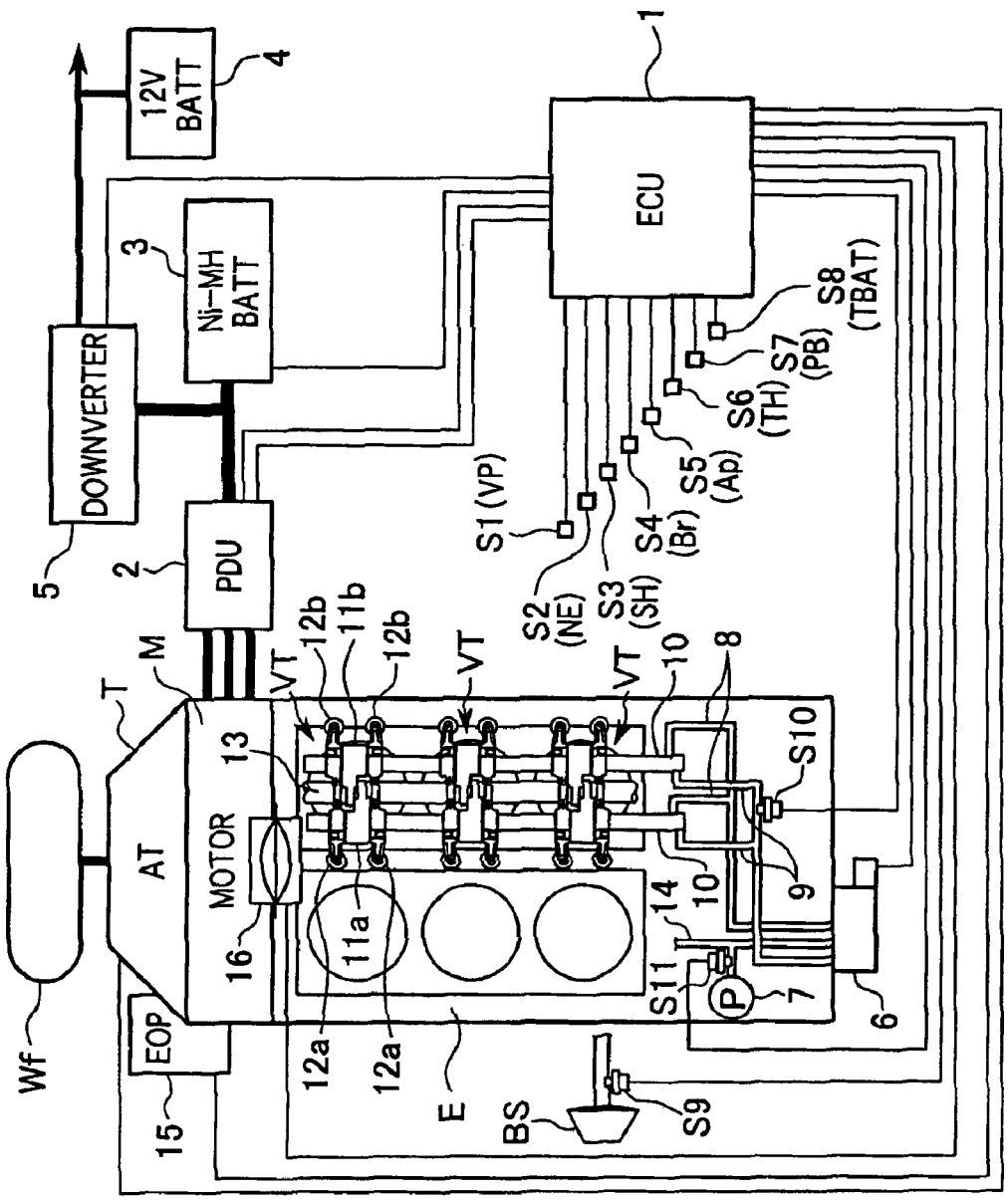
FIG. 1 is a schematic diagram showing the general structure of an embodiment of a hybrid vehicle according to the present invention.

FIG. 1 shows a parallel hybrid vehicle in the embodiment of the present invention, in which an engine E, a motor M, and a transmission T are directly coupled to each other in series. The power of the engine E and the motor M is transmitted to front wheels Wf as driving wheels (alternatively, the driving wheels may be rear wheels, or front and rear wheels) via the transmission T such as an automatic transmission (alternatively, the transmission T may be a manual transmission). When the hybrid vehicle runs in a decelerating state and the driving power is transmitted from the front wheels Wf to the motor M, the motor M acts as a generator so as to produce regenerative braking force so that the kinetic energy of the vehicle is recovered as electrical energy.

The driving operation and regenerating operation of the motor M are executed by a power drive unit (PDU) 2 that receives control signals from an ECU 1. A high-voltage nickel metal hydride battery (a battery device) 3, which sends energy to and receives energy from the motor M, is connected to the power drive unit 2. Reference symbol 4 indicates a 12-volt auxiliary battery 4 for powering various accessories. The auxiliary battery 4 is connected to the battery 3 via a downverter 5 that is a DC-DC converter. The downverter 5, which is controlled by the ECU 1, makes the voltage from the battery 3 step-down and charges the auxiliary battery 4. Note that the ECU 1 protects the battery 3 and calculates a state of charge SOC of the battery 3. Although it is not shown in FIG. 1, the battery 3 is, for example, installed under a floor of the hybrid vehicle, and the air in an interior compartment of the hybrid vehicle, which may be warmed by an interior heater that uses the heat of cooling water of the engine E, is allowed to flow around the battery 3 so that the battery 3 may be warmed using heat of the air in the interior compartment, i.e., using heat of the cooling water of the engine E.

The ECU 1 controls, in addition to the downverter 5, an amount of fuel control section (not shown) for controlling the amount of fuel supplied to the engine E, ignition timing, etc. To this end, the ECU 1 receives various signals such as a signal from a vehicle speed sensor S1 for measuring vehicle speed VP, a signal from an engine revolution rate sensor S2 for measuring engine revolution rate NE, a signal from a shift position sensor S3 for sensing the shift position SH of the transmission T, a signal from a brake switch S4 for detecting the operation of a brake pedal Br, a signal from a accelerator pedal sensor S5 for sensing a depression amount of an accelerator pedal, a signal from a throttle opening-degree sensor S6 for sensing the degree of throttle opening TH of a throttle valve, a signal from an intake negative pressure sensor S7 for sensing intake negative pressure PB in the air-intake passage, a signal from a battery temperature sensor S8 for measuring the temperature TBAT of the battery 3, and the like.

Reference symbol BS indicates a booster associated with the brake pedal, in which a master vac negative pressure sensor S9 for measuring the master vac negative pressure is provided. The master vac negative pressure sensor S9 is also connected to the ECU 1. A POIL sensor S10, a solenoid of a spool valve 6, and a TOIL sensor S11, which will be explained separately, are also connected to the ECU 1.

The engine E is of a V6 SOHC type. Each of three cylinders of the engine E in one bank is provided with a variable valve timing mechanism VT that enables a cylinder deactivation operation, and each of three cylinders in the other bank is provided with a conventional valve mechanism (not shown) that does not execute a cylinder deactivation operation. Each of the three cylinders enabling a cylinder deactivation operation is provided with two intake valves and two exhaust valves each of which can be maintained in a closed state by the variable valve timing mechanism VT that is operated via an oil pump 7, a spool valve 6, deactivation executing passage 8, and deactivation canceling passage 9.

More specifically, when a portion of operation oil, which is normally supplied to the lubrication system of the engine from the oil pump 7, is supplied to the deactivation executing passages 8 provided with the bank for a cylinder deactivation operation, cam lifting rocker arms 11a and 11b and valve operating rocker arms 12a and 12b, which are respectively supported by rocker shafts 10, and which have been driven together, are disconnected from each other and made independently operatable; therefore, the movements of the cam lifting rocker arms 11a and 11b due to rotation of a cam shaft 13 are not transmitted to the valve operating rocker arms 12a and 12b, and the intake valves and the exhaust valves remain closed. As a result, a cylinder deactivation operation, in which the intake valves and the exhaust valves of the three cylinders are maintained in a closed state, is executed. The deactivation canceling passage 9 is provided with the POIL sensor S10 which measures oil pressure in the deactivation canceling passage 9 during the cylinder deactivation operation. A lubrication line 14 connected to the oil pump 7 is provided with the TOIL sensor S11 which measures the temperature of operation oil. Reference symbol 15 indicates a motor-driven oil pump, and reference symbol 16 indicates an electronically controlled throttle.

Accordingly, the operation state of the engine E may be switched between a three-cylinder operation (a partial cylinder deactivation operation), in which three cylinders in one bank are deactivated, and a six-cylinder operation (an all-cylinder operation), in which all six cylinders in the banks are operated.

The control mode of the above hybrid vehicle includes an "idling mode", an "idling stop mode", a "deceleration mode", an "acceleration mode", and a "cruise mode". In the idling mode, the engine E is maintained in an idling state by resuming fuel supply after a fuel cut operation. In the idling stop mode, the engine E is stopped under predetermined conditions when, for example, the vehicle is stopped. In the deceleration mode, a regenerative braking operation is performed by the motor M. In the acceleration mode, the engine E is driven by the motor M. In the cruise mode, the motor M does not assist the engine E, and the vehicle is driven solely by the engine E.

Figure 2:
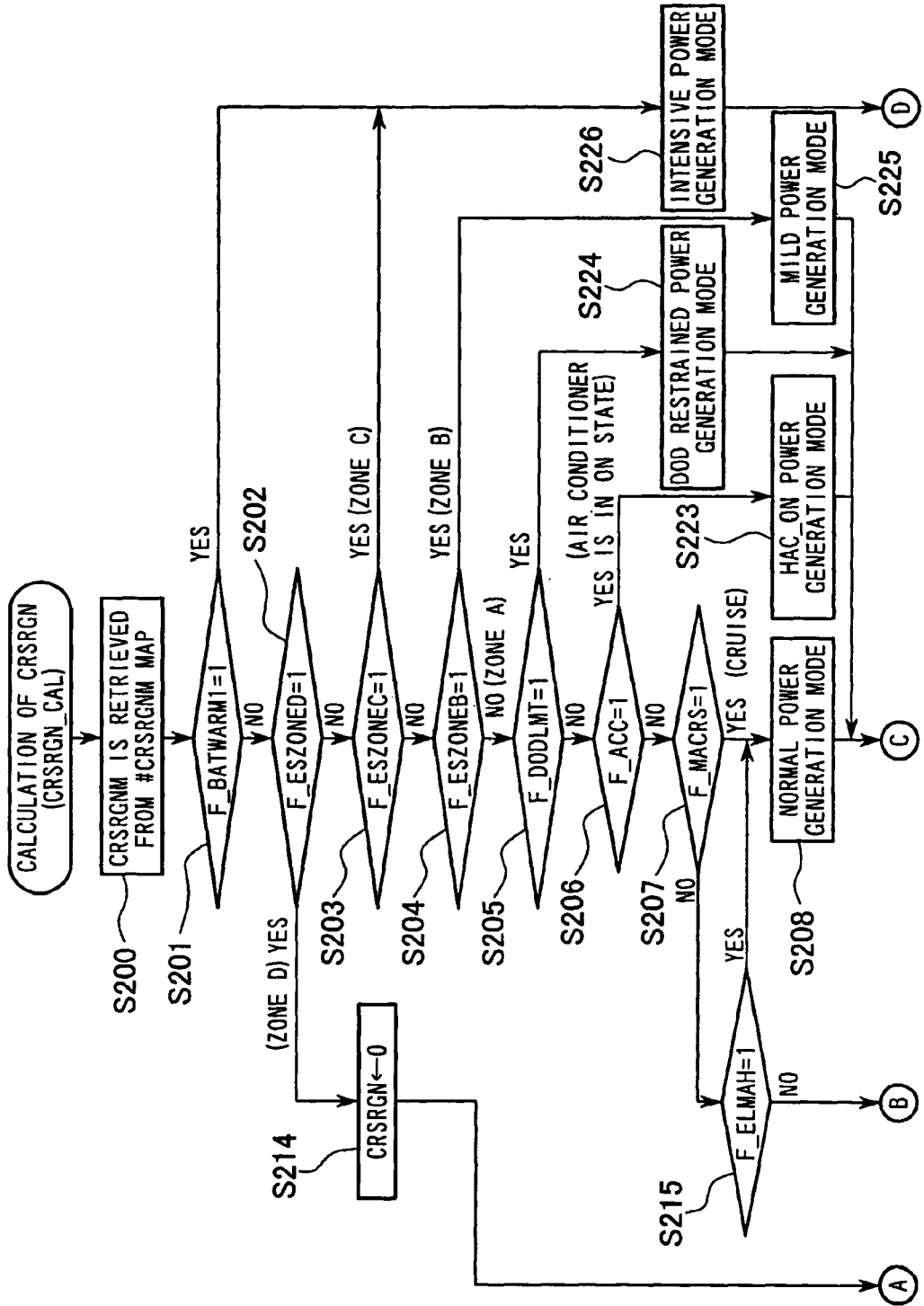
FIG. 2 is a flowchart showing the operation for calculating an amount of power generation in the embodiment of the present invention (part 1).
Figure 3:
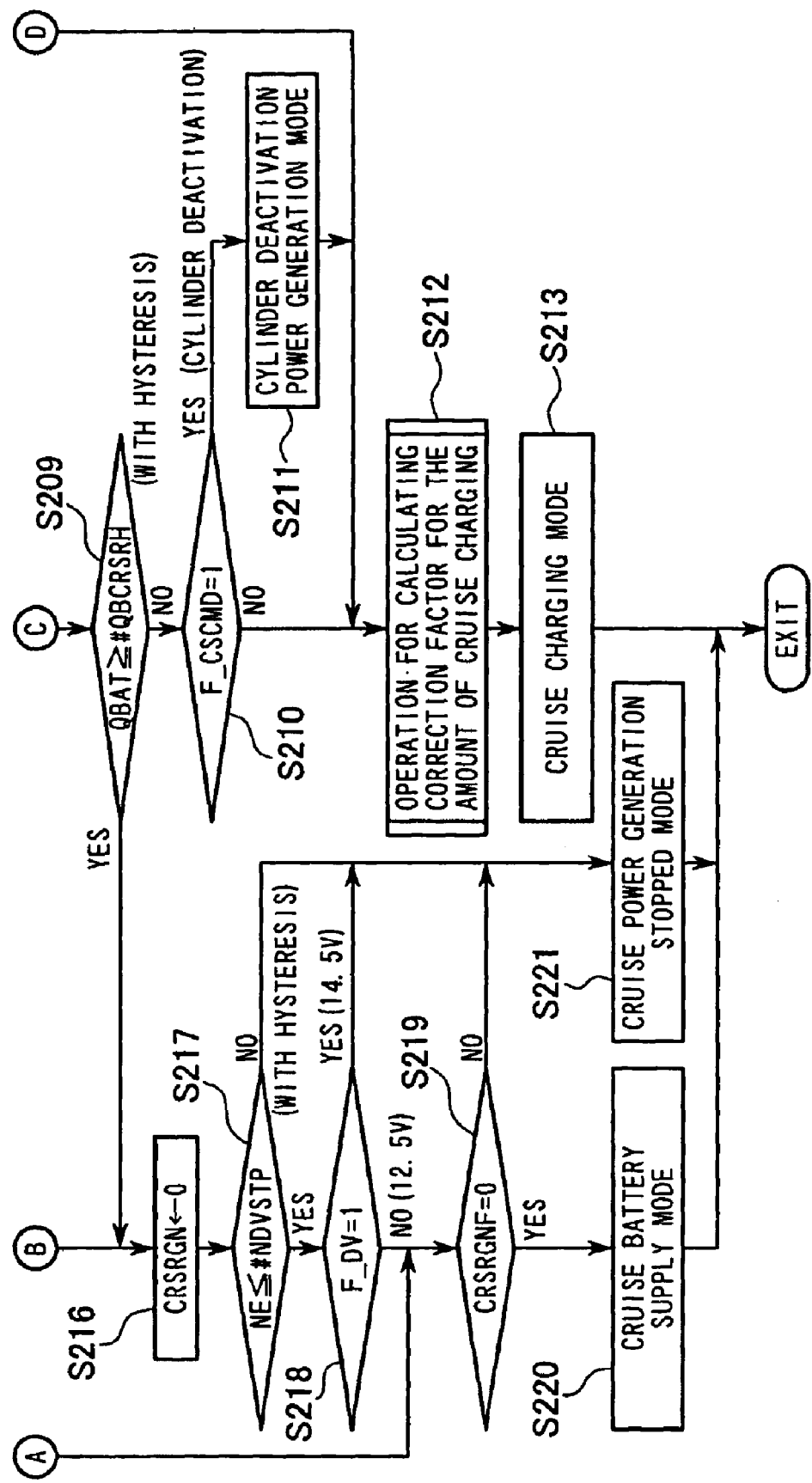
FIG. 3 is a flowchart showing the operation for calculating an amount of power generation in the embodiment of the present invention (part 2).

Next, the operation (CRSRGN_CAL) for calculating an amount of power generation CRSRGN during the cruise mode will be explained below with reference to FIGS. 2 and 3.

In this control operation, a correction factor for an amount of cruise charging is set depending on the state of charge SOC of the battery, on a state in which a degree of discharge DOD of the battery is greater than a predetermined value and a control operation is executed so as to recover the state of charge SOC of the battery, and on a state in which an air conditioner is in the ON state, so that the amount of cruise charging is set.

In step S200, an amount of cruise power generation CRSRGNM is retrieved from a #CRSRGNM map. This map (not shown) defines the amount of power generation that is set depending on the engine revolution rate NE and the intake negative pressure PB. The #CRSRGNM map for an automatic transmission is different from that for a manual transmission.

Next, in step S201, it is determined whether the value of a power generation requesting flag F_BATWARM1 for warming the battery is "1". When the result of the determination in step S201 is "YES", i.e., it is determined that the power generation requesting flag F_BATWARM1 is "1", the operation proceeds to step S226, in which a correction factor for an "intensive power generation mode" is selected, and then the operation proceeds to step S212. The correction factor for the "intensive power generation mode" is set to be greater than other correction factors, e.g., is set to be "1" that is a maximum value. Accordingly, when the power generation requesting flag F_BATWARM1 is "1", the amount of cruise charging is maximized, and warming the battery can be most effectively performed using Joule heat due to internal resistance of the battery.

In step S212, the operation for calculating the correction factor for the amount of cruise charging is executed, and the cruise charging mode is set in step S213, and then the operation is terminated. More specifically, this operation is executed to determine the correction factor for the amount of cruise charging that is a final correction factor to be multiplied by the amount of cruise power generation CRSRGNM obtained in step S200. The final correction factor is determined based on each of correction factors in the aforementioned "intensive power generation mode" in step S226, in a "mild power generation mode" in step S225, in a "DOD restrained power generation mode" in step S224, in a "HAC_ON power generation mode" in step S223, in a "normal power generation mode" in step S208, in a "cylinder deactivated power generation mode" in step S211, which will be explained below, and taking into account vehicle speed and ambient atmospheric pressure. In the cruise charging mode in step S213, charging of the battery is executed at the amount of cruise charging that is obtained by multiplying the correction factor for the amount of cruise charging by the amount of cruise power generation CRSRGNM.

When the result of the determination in step S201 is "NO", the operation proceeds to step S202, in which it is determined whether an energy storage zone D determination flag F_ESZONED is "1".

In this embodiment, in the ECU 1, the state of charge SOC, which is determined depending on, for example, voltage, discharging current, temperature, etc., is classified into, for example, four zones A, B, C, and D (which is referred to as "zoning"). More specifically, a zone A (from SOC 40% to SOC 80 or 90%) that is a normal use zone is set to be a basic zone, below which a zone B (from SOC 20% to SOC 40%) that is a temporary use zone is set, below which a zone C (from SOC 0% to SOC 20%) that is an excessively discharged zone is set, and a zone D (from SOC 80 or 90% to SOC 100%) that is an excessively charged zone is set above the zone A.

When the result of the determination in step S202 is "YES", i.e., it is determined that the state of charge SOC is in the zone D that is the excessively charged zone, because further charging is not possible, the operation proceeds to step S214, in which the amount of cruise power generation is set to be "0", and then the operation proceeds to step S219. In step S219, it is determined whether a final command for cruise power generation CRSRGNF is "0". When the result of determination indicates that the command is not "0", the operation proceeds to step S221, in which a "cruise power generation stopped mode" is selected, and the control operation is terminated. When the result of the determination in step S219 indicates that the command is "0", the operation proceeds to step S220, in which a "cruise battery supply mode" is selected, and the control operation is terminated. In the cruise battery supply mode, because the state of charge of the battery 3 is high, electrical power required by the 12-volt system in the vehicle is supplied by the high voltage battery 3 so that the state of charge of the battery 3 is decreased so as to make the battery 3 accept regenerated energy.

When the result of the determination in step S202 is "NO", i.e., it is determined that the state of charge SOC is not in the zone D, the operation proceeds to step S203, in which it is determined whether an energy storage zone C determination flag F_ESZONEC is "1". When the result of the determination is "YES", i.e., it is determined that the state of charge SOC is in the zone C that is the excessively discharged zone, the operation proceeds to step S226.

In contrast, when the result of the determination in step S203 is "NO", the operation proceeds to step S204.

In step S204, it is determined whether an energy storage zone B determination flag F_ESZONEB is "1". When the result of the determination is "YES", i.e., it is determined that the state of charge SOC is in the zone B that is the temporary use zone of the battery 3 in which a smaller amount of charging is executed than in the zone C, the operation proceeds to step S225. In step S225, a correction factor for the "mild power generation mode" is selected, and the operation proceeds to step S209.

In step S209, it is determined whether a state of charge QBAT (having the same meaning as the state of charge SOC) is equal to or greater than an upper limit of the state of charge for the normal power generation mode #QBCRSRH. Note that the upper limit of the state of charge for the normal power generation mode #QBCRSRH has hysteresis. When the result of the determination in step S209 is "YES", i.e., it is determined that the state of charge QBAT is equal to or greater than the upper limit of the state of charge for the normal power generation mode #QBCRSRH, the operation proceeds to step S216. In contrast, when it is determined that the state of charge QBAT is less than the upper limit of the state of charge for the normal power generation mode #QBCRSRH, the operation proceeds to step S210.

In step S210, it is determined whether a cylinder deactivation flag F_CSCMD is "1". As will be explained below, the cylinder deactivation flag F_CSCMD is set to be "1" when the cylinder deactivation operation is applied to the aforementioned three cylinders under predetermined conditions.

When the result of the determination is "YES", i.e., it is determined that the cylinder deactivation operation is being executed, the operation proceeds to step S211, in which a correction factor for the "cylinder deactivated power generation mode" is selected, and then the operation proceeds to step S212. When the result of the determination is "NO", the operation proceeds to step S212.

In contrast, when the result of the determination in step S204 is "NO", the operation proceeds to step S205, in which it is determined whether a DOD limit determination flag F_DODLMT is "1". When the result of the determination in step S205 is "YES", the operation proceeds to step S224, in which a correction factor for the "DOD restrained power generation mode" is selected, and then the operation proceeds to step S209.

When the result of the determination in step S205 is "NO", the operation proceeds to step S206, in which it is determined whether the flag value of an air conditioner ON flag F_ACC is "1". When the result of the determination is "YES", i.e., it is determined that an air conditioner is in the ON state, the operation proceeds to step S223, in which a correction factor for the "HAC_ON power generation mode" is selected, and then the operation proceeds to step S209.

In step S216, the amount of cruise power generation CRSRGNM is set to be "0", and the operation proceeds to step S217. In step S217, it is determined whether the engine revolution rate NE is equal to or less than an upper limit of the engine revolution rate for the cruise battery supply mode #NDVSTP. When the result of the determination is "YES", i.e., it is determined that the engine revolution rate NE is equal to or less than the upper limit of the engine revolution rate for the cruise battery supply mode #NDVSTP, the operation proceeds to step S218. When the result of the determination in step S217 is "NO", i.e., it is determined that the engine revolution rate NE is greater than the upper limit of the engine revolution rate for the cruise battery supply mode #NDVSTP, the operation proceeds to step S221. Note that the upper limit of the engine revolution rate for the cruise battery supply mode #NDVSTP has hysteresis.

In step S218, it is determined whether a 12-volt system power request flag F_DV is "1". When the result of the determination is "YES", i.e., it is determined that a load in the 12-volt system is high, the operation proceeds to step S221. In contrast, when the result of the determination in step S218 is "NO", i.e., it is determined that a load in the 12-volt system is low, the operation proceeds to step S219.

When the result of the determination in step S206 is "NO", i.e., it is determined that the air conditioner is in the OFF state, the operation proceeds to step S207, in which it is determined whether the flag value of a cruise mode determination flag F_MACRS is "1".

When the result of the determination in step S207 is "NO", i.e., it is determined that the cruise mode is not selected, the operation proceeds to step S215, in which it is determined whether a 12-volt system large current indicating flag F_ELMAH, which indicates whether or not a large amount of current flows in the 12-volt system, is "1".

When it is determined, in step S215, that the flag F_ELMAH is "1", i.e., when it is determined that a large amount of current flows in the 12-volt system, the operation proceeds to step S208, as in the case of affirmative result in step S207, in which a correction factor for the "normal power generation mode" is selected, and then the operation proceeds to step S209.

When it is determined, in step S215, that the flag F_ELMAH is "0", i.e., when it is determined that a small amount of current flows in the 12-volt system, the operation proceeds to step S216.

Figure 4:
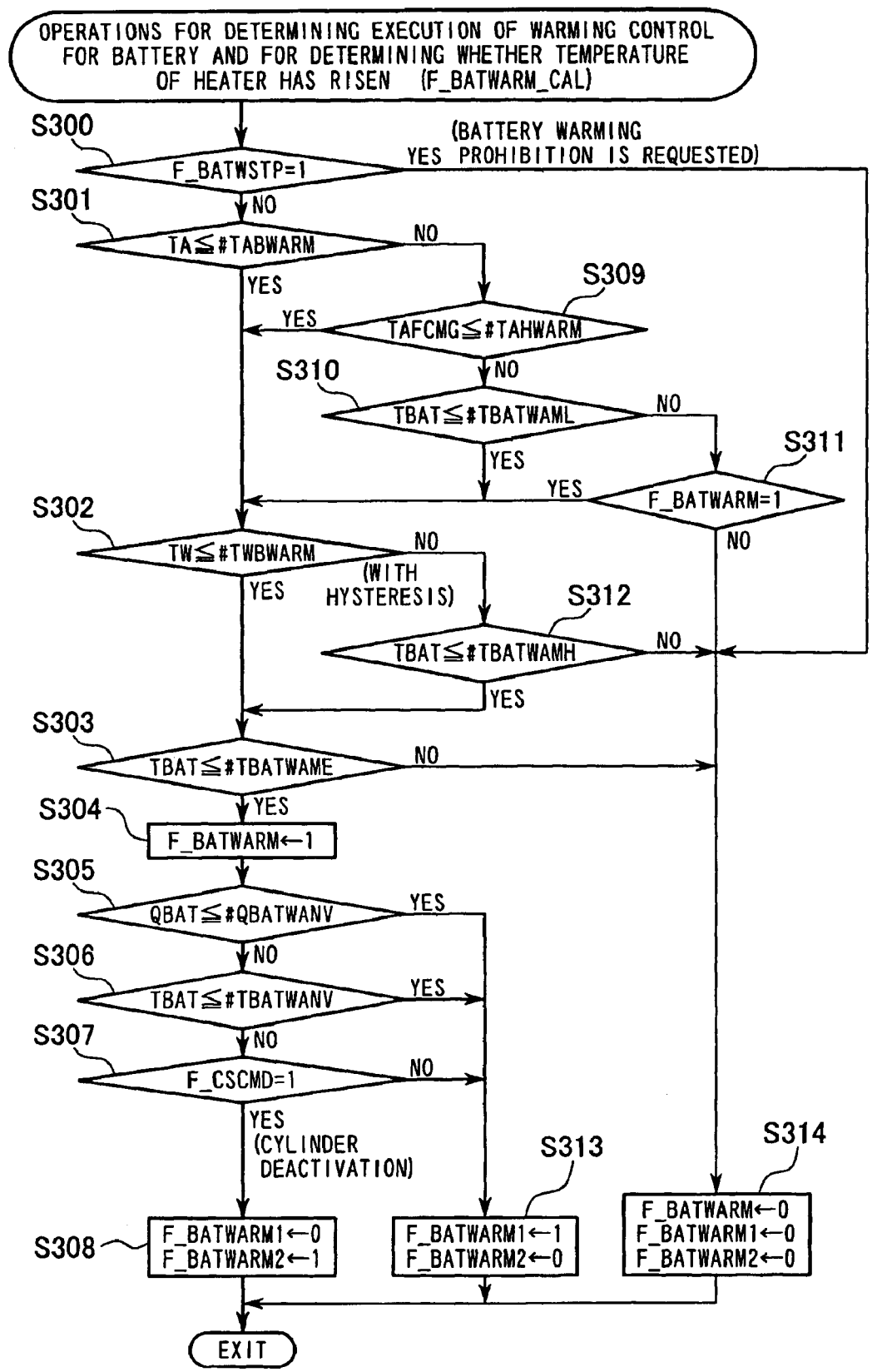
FIG. 4 is a flowchart showing the operations for determining execution of warming control for the battery and for determining whether the temperature of a heater has risen in the embodiment of the present invention.

Next, the operations for determining execution of warming control for the battery and for determining whether the temperature of the heater has risen (F_BATWARM_CAL) will be explained with reference to FIG. 4.

In this control operation, one of the following manners of control regarding the warming control for the battery 3 is selected: the warming control for the battery by execution of power generation in which the battery 3 is warmed using Joule heat that is generated during charging of the generated electrical energy generated by the motor M into the battery 3 due to the internal resistance of the battery 3; the warming control for the battery by execution of vibration control in which the battery 3 is warmed using Joule heat that is generated during charging into and discharging from the battery 3 due to the internal resistance of the battery 3 when the motor M is operated so as to reduce vibration of the engine E; and a manner of control in which no warming control for the battery is executed.

More specifically, in this control operation, as a first step, it is determined whether or not the warming control for the battery is required, and as a second step, when the warming control is required, one of the warming control for the battery by execution of power generation and the warming control for the battery by execution of vibration control is selected depending on whether or not the cylinder deactivation operation is being executed.

In step S300, it is determined whether the warming control for the battery is prohibited by determining whether a flag F_BATWSTP is "1". When the result of the determination is "YES", i.e., it is determined that the warming control for the battery is prohibited, the operation proceeds to step S314. When the result of the determination is "NO", the operation proceeds to step S301.

In step S314, a battery warming control request flag F_BATWARM, a battery warming by power generation request flag F_BATWARM1, and a battery warming by vibration control request flag F_BATWARM2 are set to be "0", respectively, and the control operation is terminated. As a result, the warming control will not be applied to the battery 3.

In step S301, it is determined whether the temperature of intake air TA is equal to or lower than a predetermined lower limit temperature #TABWARM. For example, the lower limit temperature #TABWARM is set to be −10° C. When the result of the determination is "YES", the operation proceeds to step S302. When the result of the determination is "NO", the operation proceeds to step S309, in which it is determined whether an estimated ambient temperature TAFCMG is equal to or lower than a predetermined value #TAHWARM.

When the result of the determination is "YES", i.e., it is determined that the estimated ambient temperature TAFCMG is equal to or lower than the predetermined value #TAHWARM, the operation proceeds to step S302. When the result of the determination is "NO", i.e., it is determined that the estimated ambient temperature TAFCMG is higher than the predetermined value #TAHWARM, the operation proceeds to step S310. For example, the predetermined value #TAHWARM is set to be 0° C.

In step S310, it is determined whether the temperature of the battery TBAT is equal to or lower than a predetermined value #TBATWAML that is included in information sent from the motor M. When the result of the determination is "YES", i.e., it is determined that the temperature of the battery TBAT is equal to or lower than the predetermined value #TBATWAML, the operation proceeds to step S302, and when the result of the determination is "NO", i.e., it is determined that the temperature of the battery TBAT is greater than the predetermined value #TBATWAML, the operation proceeds to step S311. Note that the predetermined value #TBATWAML is the temperature of the battery indicating execution of warming, and is set to be, for example, −10° C.

In step S311, it is determined whether the battery warming control request flag F_BATWARM is "1". When the result of the determination is "YES", the operation proceeds to step S302, and when the result of the determination is "NO", the operation proceeds to step S314.

In step S302, it is determined whether the temperature TW of cooling water of the engine is equal to or less than a predetermined lower limit temperature #TWBWARM. Note that the predetermined lower limit temperature #TWBWARM is set to be, for example, 0° C., and has hysteresis. When the result of the determination is "YES", the operation proceeds to step S303, and when the result of the determination is "NO", the operation proceeds to step S312.

In step S312, it is determined whether the temperature of the battery TBAT is equal to or lower than a predetermined value #TBATWAMH that is included in information sent from the motor M. When the result of the determination is "YES", i.e., it is determined that the temperature of the battery TBAT is equal to or lower than the predetermined value #TBATWAMH, the operation proceeds to step S303, and when the result of the determination is "NO", i.e., it is determined that the temperature of the battery TBAT is higher than the predetermined value #TBATWAMH, the operation proceeds to step S314. Note that the predetermined value #TBATWAMH is the temperature of the battery indicating completion of warming, and is set to be, for example, 0° C.

In step S303, it is determined whether the temperature of the battery TBAT is equal to or lower than a predetermined value #TBATWAME that is included in information sent from the motor M. When the result of the determination is "YES", i.e., it is determined that the temperature of the battery TBAT is equal to or lower than the predetermined value #TBATWAME, the operation proceeds to step S304, and when the result of the determination is "NO", i.e., it is determined that the temperature of the battery TBAT is higher than the predetermined value #TBATWAME, the operation proceeds to step S314. Note that the predetermined value #TBATWAME is the temperature of the battery indicating prohibition of warming, and is set to be, for example, 40° C.

In step S304, the battery warming control request flag F_BATWARM is set to be "1", and the operation proceeds to step S305.

In step S305, it is determined whether the state of charge of the battery QBAT (having the same meaning as SOC) is equal to or less than a lower limit of the state of charge for execution of vibration control #QBATWANV (e.g., 60%). When the result of the determination is "YES", the operation proceeds to step S313, and when the result of the determination is "NO", the operation proceeds to step S306.

In step S313, the battery warming by power generation request flag F_BATWARM1 is set to be "1", and the battery warming by vibration control request flag F_BATWARM2 is set to be "0", and then the control operation is terminated. As a result, the warming control for the battery by execution of power generation is performed.

In step S306, it is determined whether the temperature of the battery TBAT is equal to or lower than a lower limit temperature for execution of vibration control #TBATWANV (e.g., −15° C.). When the result of the determination is "YES", the operation proceeds to step S313, and when the result of the determination is "NO", the operation proceeds to step S307.

In step S307, it is determined whether a cylinder deactivation flag F_CSCMD is "1". When the result of the determination is "YES", i.e., it is determined that the cylinder deactivation is being executed, the operation proceeds to step S308, and when the result of the determination is "NO", i.e., it is determined that the cylinder deactivation is not executed, the operation proceeds to step S313. In step S308, the battery warming by power generation request flag F_BATWARM1 is set to be "0", and the battery warming by vibration control request flag F_BATWARM2 is set to be "1", and then the control operation is terminated. As a result, the warming control for the battery by execution of vibration control is performed.

Figure 9:
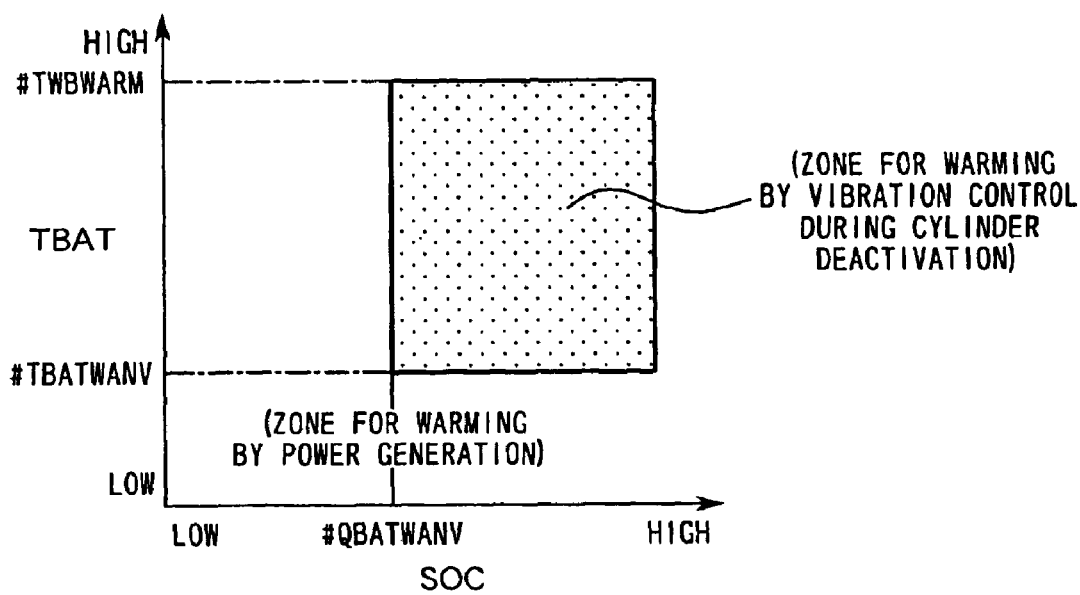
FIG. 9 is a graph showing a zone for warming the battery by vibration control during a cylinder deactivation operation and a zone for warming the battery by power generation in the embodiment of the present invention.

As explained above, through the determinations in steps S305, S306, and S307, when the state of charge of the battery 3 is greater than the lower limit of the state of charge for execution of vibration control #QBATWANV, and the temperature of the battery 3 is higher the lower limit temperature for execution of vibration control #TBATWANV, and provided that the cylinder deactivation operation is being executed as determined in step S307, the warming control for the battery by execution of vibration control is performed (in step S308) in a zone for warming the battery by vibration control during a cylinder deactivation operation shown in FIG. 9. In FIG. 9, the horizontal axis represents the state of charge SOC of the battery 3, and the vertical axis represents the temperature of the battery TBAT.

Moreover, through the determinations in steps S305 and S306, and in steps S503 and S504 which will be explained separately, when the state of charge of the battery is equal to or less than the lower limit of the state of charge for execution of vibration control #QBATWANV, or when the temperature of the battery 3 is equal to or lower than the lower limit temperature for execution of vibration control #TBATWANV, the cylinder deactivation operation is not set in step S508 which will be explained separately; therefore, the warming control for the battery by execution of power generation is performed (in step S313) in a zone for warming the battery by power generation shown in FIG. 9.

Figure 5:
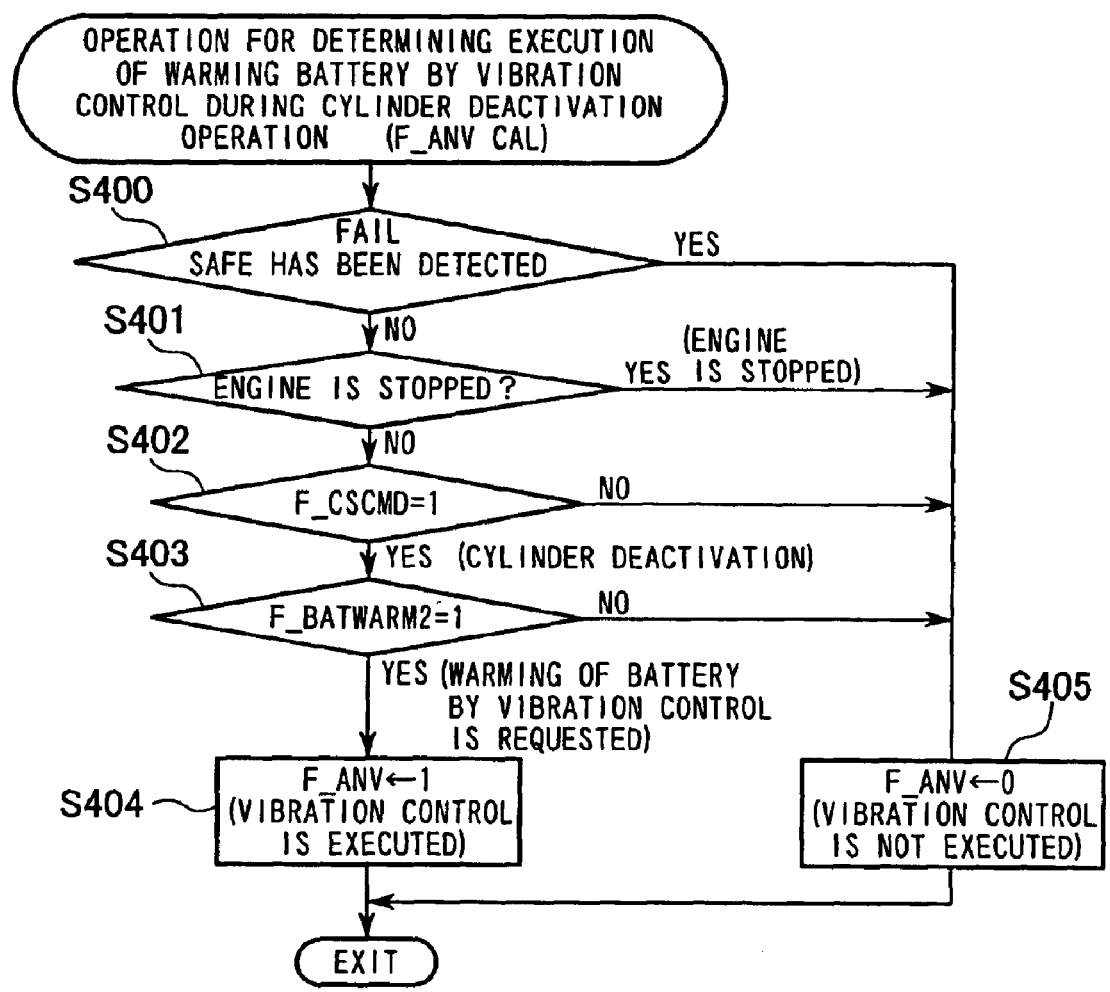
FIG. 5 is a flowchart showing the operation for determining execution of warming the battery by vibration control during a cylinder deactivation operation in the embodiment of the present invention.

Next, the operation for determining execution of warming the battery by vibration control during a cylinder deactivation operation (F_ANV CAL) will be explained with reference to FIG. 5.

In this control operation, it is determined whether or not the warming control for the battery by execution of vibration control is to be executed, in which the battery 3 is warmed using Joule heat that is generated during charging into and discharging from the battery 3 due to the internal resistance of the battery 3 when the motor M is operated so as to reduce vibration of the engine E. More specifically, a vibration control flag F_ANV is set through this operation.

In step S400, it is determined whether a fail safe signal has been detected. When the result of the determination is "YES", the operation proceeds to step S405, and when the result of the determination is "NO", the operation proceeds to step S401. In step S405 the vibration control flag F_ANV is set to be "0", and the control operation is terminated. This operation is provided because the vibration control should not be executed when there is some abnormality.

In step S401, it is determined whether or not the engine E is stopped. When it is determined that the engine E is stopped, the operation proceeds to step S405 because the vibration control operation is not required. In contrast, when it is determined that the engine is running, the operation proceeds to step S402.

In step S402, it is determined whether the cylinder deactivation flag F_CSCMD is "1". When the result of the determination is "YES", i.e., it is determined that the cylinder deactivation is being executed, the operation proceeds to step S403. When the result of the determination is "NO", i.e., it is determined that the cylinder deactivation is not executed, the operation proceeds to step S405.

In step S403, it is determined whether the battery warming by vibration control request flag F_BATWARM2 is "1". When the result of the determination is "YES", i.e., it is determined that the battery warming by vibration control is requested, the operation proceeds to step S404. When the result of the determination is "NO", i.e., it is determined that the battery warming by vibration control is not requested, the operation proceeds to step S405.

In step S404, the vibration control flag F_ANV is set to be "1", and the control operation is terminated. As a result, the warming control for the battery by execution of vibration control is performed.

Figure 6:
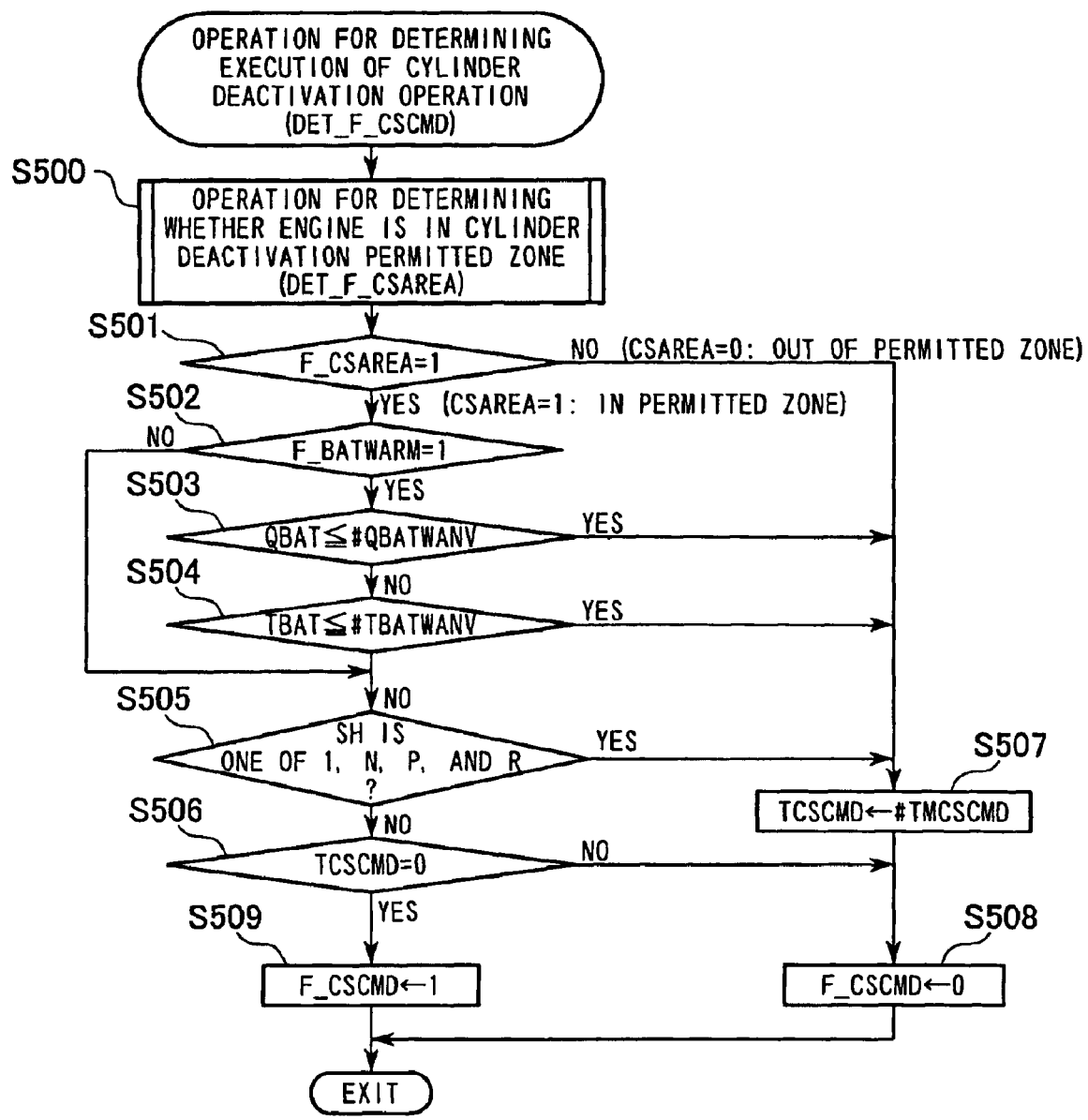
FIG. 6 is a flowchart showing the operation for determining execution of a cylinder deactivation operation in the embodiment of the present invention.

Next, the operation for determining execution of cylinder deactivation (DET_F_CSCMD), in which it is determined whether or not the cylinder deactivation operation is executed, will be explained with reference to FIG. 6. In this control operation, it is determined whether or not the cylinder deactivation operation may be executed referring to various conditions.

In step S500, the operation for determining whether the engine is in a cylinder deactivation operation permitted zone is executed. The details of this control operation will be explained separately.

In step S501, it is determined whether a cylinder deactivation zone flag F_CSAREA is "1". When the result of the determination is "YES", i.e., it is determined that the engine is in the cylinder deactivation operation permitted zone, the operation proceeds to step S507. When the result of the determination is "NO", i.e., it is determined that the engine is not in the cylinder deactivation operation permitted zone the operation proceeds to step S507. In step S507, a timer value TCSCMD is set to be a predetermined value #TMCSCMD, and the operation proceeds to step S508, in which the cylinder deactivation flag F_CSCMD is set to be "0", and then the control operation is terminated. As a result, the cylinder deactivation operation is not executed.

In step S502, it is determined whether the battery warming control request flag F_BATWARM is "1". When the result of the determination in step S502 is "YES", i.e., it is determined that the battery warming control request flag F_BATWARM is "1", the operation proceeds to step S503, and when the result of the determination is "NO", i.e., it is determined that the battery warming control request flag F_BATWARM is "0", the operation-proceeds to step S505.

In step S503, it is determined whether the state of charge of the battery QBAT (having the same meaning as SOC) is equal to or less than the lower limit of the state of charge for execution of vibration control #QBATWANV. When the result of the determination is "YES", the operation proceeds to step S507, and when the result of the determination is "NO", the operation proceeds to step S504.

In step S504, it is determined whether the temperature of the battery TBAT is equal to or lower than the lower limit temperature for execution of vibration control #TBAT-WANV. When the result of the determination is "YES", the operation proceeds to step S507, and when the result of the determination is "NO", the operation proceeds to step S505.

In step S505, it is determined whether or not the shift position is in one of "$1^{st}$" (low position), "N" (neutral position), "P" (parking position), and "R" (reverse position). When the result of the determination is "YES", the operation proceeds to step S507, and when the result of the determination is "NO", i.e., it is determined that the shift position is in one of "$2^{nd}$", "$3^{rd}$", "$4^{th}$", and "$5^{th}$", the operation proceeds to step S506. This determination is provided because the cylinder deactivation operation should not be executed when the shift position is in one of "$1^{st}$", "N", "P", and "R".

In step S506, it is determined whether the timer value TCSCMD is "0". The timer value TCSCMD has been set in step S507 because a predetermined time #TCSCMD is required during a transition from the all-cylinder operation state to the partial cylinder deactivation operation state. When the result of the determination in step S506 is "YES", the operation proceeds to step S509, and when the result of the determination is "NO", the operation proceeds to step S508. In step S509, the cylinder deactivation flag F_CSCMD is set to be "1", and the control operation is terminated. As a result, the cylinder deactivation operation is executed.

Figure 7:
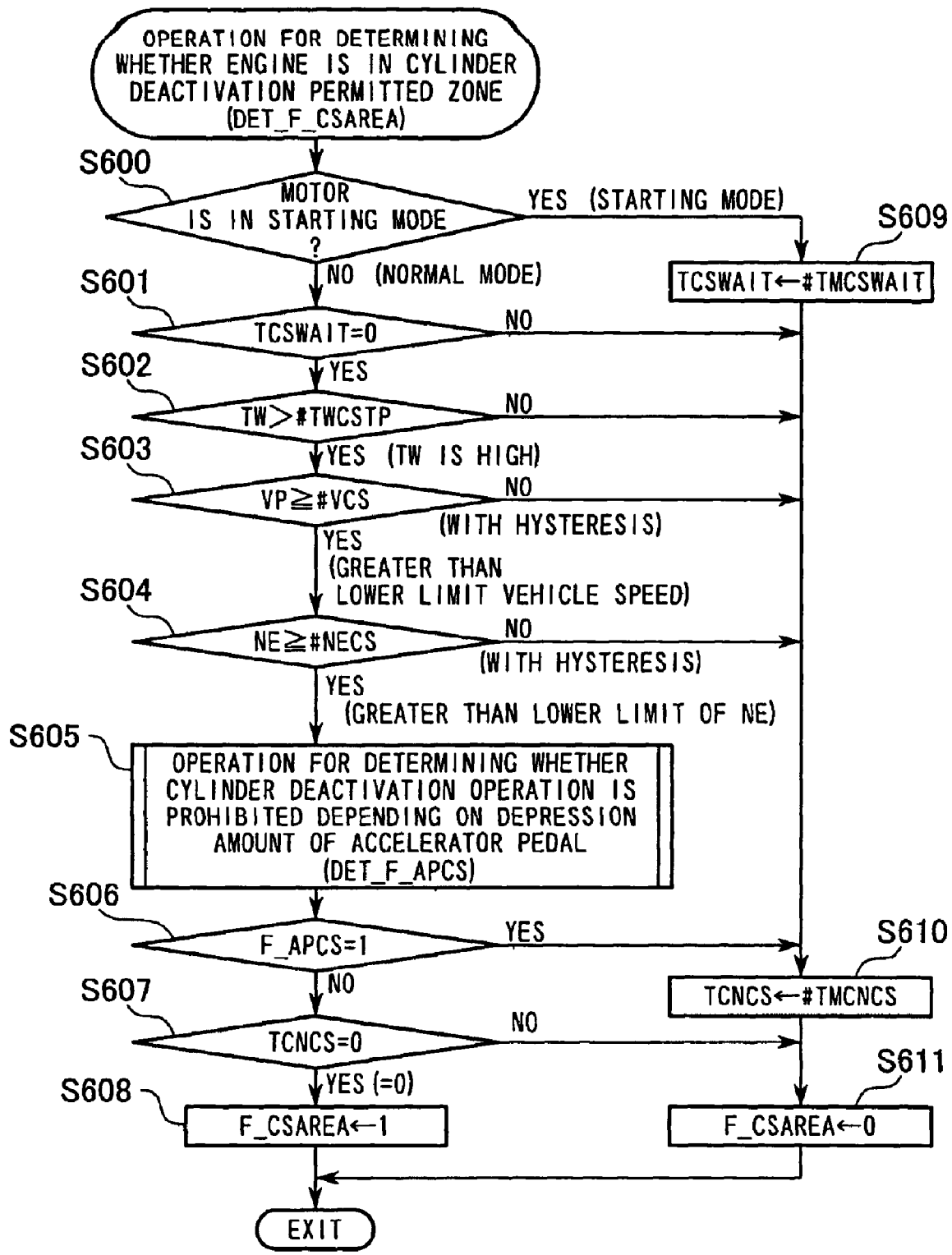
FIG. 7 is a flowchart showing the operation for determining whether the engine is in a cylinder deactivation operation permitted zone.

Next, the operation (DET_F_CSAREA) for determining whether the engine is in the cylinder deactivation operation permitted zone will be explained with reference to FIG. 7. In this control operation, it is determined whether the engine is in the cylinder deactivation operation permitted zone. More specifically, when the flag F_CSAREA is "1", it is determined that the cylinder deactivation operation may be executed, and when the flag F_CSAREA is "0", it is determined that the cylinder deactivation operation may not be executed.

In step S600, it is determined whether the motor M is in a starting mode. When the result of the determination is "YES", i.e., it is determined that the motor M is in the starting mode, the operation proceeds to step S609, in which a timer value TCSWAIT is set to be a predetermined value #TCSWAIT, and the operation proceeds to step S610. In step S610, a timer value TCNCS is set to be a predetermined value #TCNCS, and the operation proceeds to step S611, in which the cylinder deactivation zone flag F_CSAREA is set to be "0", and then the control operation is terminated. As a result, it is determined that the engine is not in the cylinder deactivation operation permitted zone. Accordingly, the determination result in step S501 shown in FIG. 6 is "NO", and the cylinder deactivation operation is not executed (step S508 in FIG. 6). This determination is provided because the cylinder deactivation operation should not be executed when the motor M is in the starting mode.

When the result of the determination in step S600 is "NO", i.e., it is determined that the motor M is not in the starting mode, and is in a normal mode, the operation proceeds to step S601, in which it is determined whether the timer value TCSWAIT is "0". This determination is provided because it is preferable to have a predetermined time from start of the motor M even though the motor M is not in the starting mode.

When the result of the determination in step S601 is "YES", i.e., the timer value TCSWAIT becomes "0" after a predetermined time has passed, the operation proceeds to step S602, and when the result of the determination is "NO", the operation proceeds to step S610.

In step S602, it is determined whether the temperature TW of cooling water of the engine is equal to or higher than a predetermined value #TWCSTP. When the result of the determination is "YES", the operation proceeds to step S603, and when the result of the determination is "NO", the operation proceeds to step S610. This determination is provided because the cylinder deactivation operation should not be executed when the temperature TW of cooling water of the engine is low since the cylinder deactivation operation applies a large load to the engine E.

In step S603, it is determined whether the vehicle speed VP is equal to or greater than a lower limit vehicle speed for execution of the cylinder deactivation operation #VCS. Note that the lower limit vehicle speed for execution of the cylinder deactivation operation #VCS has hysteresis. When the result of the determination is "YES", the operation proceeds to step S604, and when the result of the determination is "NO", the operation proceeds to step S610. This determination is provided because the cylinder deactivation operation should not be executed when the vehicle speed VP is too low.

In step S604, it is determined whether the engine revolution rate NE is equal to or greater than a lower limit engine revolution rate for execution of the cylinder deactivation operation #NECS. Note that the lower limit engine revolution rate for execution of the cylinder deactivation operation #NECS has hysteresis. When the result of the determination is "YES" (i.e., NE≧#NECS), the operation proceeds to step S605, and when the result of the determination is "NO" (i.e., NE<#NECS), the operation proceeds to step S610.

In step S605, the operation (DET_F_APCS) for determining whether the cylinder deactivation operation is prohibited depending on the depression amount of the accelerator pedal is executed, and the operation proceeds to step S606. The operation in step S605 is provided in order to determine whether or not the cylinder deactivation operation should be prohibited depending on the depression amount of the accelerator pedal. The operation in step S605 will be explained separately.

In step S606, it is determined whether a cylinder deactivation prohibition flag F_APCS is "1". When the value of the flag F_APCS is "1", the cylinder deactivation operation is prohibited, and when the value of the flag F_APCS is "0", the cylinder deactivation operation is permitted. When the result of the determination in step S606 is "YES", i.e., it is determined that the cylinder deactivation prohibition flag F_APCS is "1", the operation proceeds to step S610, and when the result of the determination is "NO", i.e., it is determined that the cylinder deactivation prohibition flag F_APCS is "0", the operation proceeds to step S607.

In step S607, it is determined whether the timer value TCNCS set in step S610 is "0". When the result of the determination is "YES", the operation proceeds to step S608, and when the result of the determination is "NO", the operation proceeds to step S611. The timer value TCNCS is provided in order to ensure a predetermined time #TCNCS between a determination that the engine is not in the cylinder deactivation operation permitted zone and a determination that the engine is in the cylinder deactivation operation permitted zone.

In step S608, the cylinder deactivation zone flag F_CSAREA is set to be "1" in order to permit the cylinder deactivation operation, and the control operation is terminated. In step S611, the cylinder deactivation zone flag F_CSAREA is set to be "0" in order to prohibit the cylinder deactivation, and the control operation is terminated.

Figure 8:
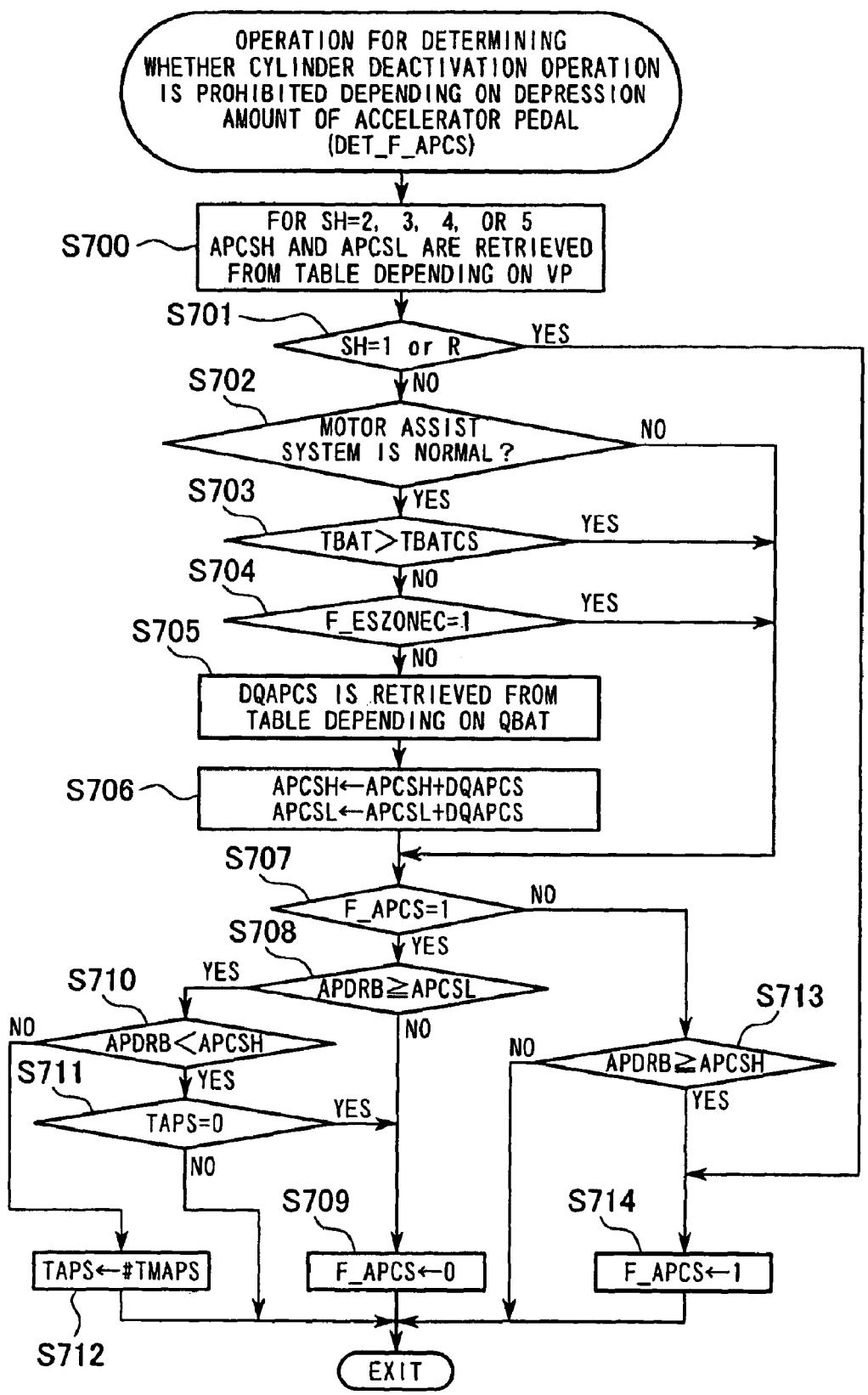
FIG. 8 is a flowchart showing the operation for determining whether cylinder deactivation operation is prohibited depending on the depression amount of the accelerator pedal.

Next, the operation for determining whether the cylinder deactivation operation is prohibited depending on the depression amount of the accelerator pedal will be explained with reference to FIG. 8. This control operation is provided in order to determine whether or not the cylinder deactivation operation should be prohibited depending on the depression amount of the accelerator pedal. More specifically, in this control operation, when the flag F_APCS is "1", the cylinder deactivation operation is prohibited (in steps S606, S611, and S501), and when the flag F_APCS is "0", the cylinder deactivation operation is permitted.

Figure 10:
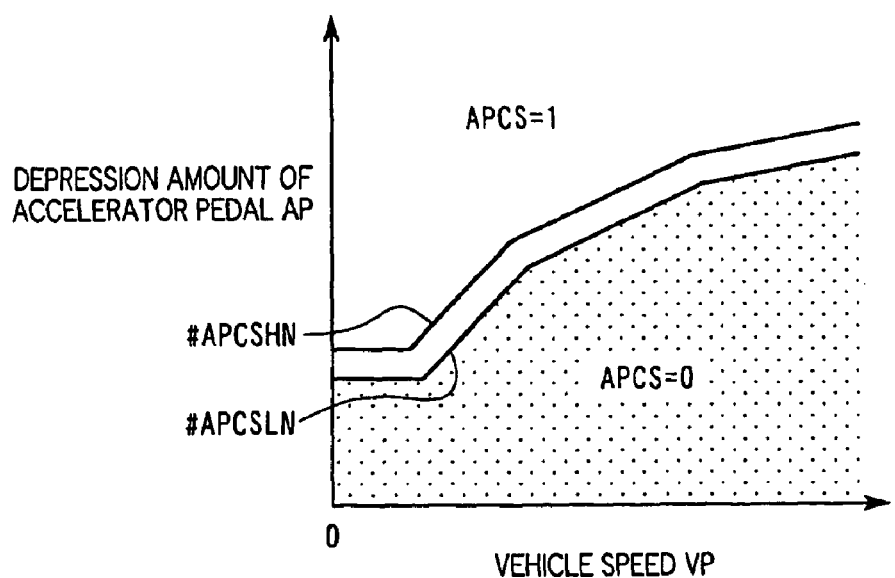
FIG. 10 is a graph showing a zone for warming the battery by vibration control during a cylinder deactivation operation and a zone for warming the battery by power generation in the embodiment of the present invention.

In step S700, for each of the shift positions SH, i.e., "$2^{nd}$", "$3^{rd}$", "$4^{th}$", and "$5^{th}$", an upper threshold APCSH and a lower threshold APCSL as thresholds for the depression amount of the accelerator pedal for prohibiting the cylinder deactivation operation #APCS are retrieved from a table depending on the vehicle speed VP, and the operation proceeds to step S701. In other words, as shown in FIG. 10, the threshold #APCS having a range from the upper threshold APCSH to the lower threshold APCSL is set to the depression amount of the accelerator pedal for prohibiting the cylinder deactivation operation that is provided for each of the shift positions depending on the vehicle speed VP. In FIG. 10, the horizontal axis represents the vehicle speed VP, and the vertical axis represents the depression amount of the accelerator pedal AP.

In step S701, it is determined whether or not the shift position SH is in one of "$1^{st}$" and "R". When the result of the determination is "YES", the operation proceeds to step S714, and when the result of the determination is "NO", the operation proceeds to step S702. In step S714, the cylinder deactivation prohibition flag F_APCS is set to be "1", and the control operation is terminated. This operation is provided because the cylinder deactivation operation should be prohibited when the shift position SH is in one of "$1^{st}$" and "R".

In step S702, it is determined whether power assist for the engine E by the motor M is being normally performed. When the result of the determination is "YES", the operation proceeds to step S703, and when the result of the determination is "NO", the operation proceeds to step S707. This determination is provided because the cylinder deactivation operation permitted zone should not be expanded in steps S705 and S706 when power assist for the engine E by the motor M is not normally performed.

In step S703, it is determined whether the temperature of the battery TBAT is higher than a lower limit battery temperature for execution of the cylinder deactivation operation #TBATCS. When the result of the determination is "YES", the operation proceeds to step S707, and when the result of the determination is "NO", the operation proceeds to step S704.

In step S704, it is determined whether the energy storage zone C determination flag F_ESZONEC is "1". When the result of the determination is "YES", i.e., it is determined that the state of charge SOC is in the zone C that is the excessively discharged zone, the operation proceeds to step S707. In contrast, when the result of the determination is "NO", the operation proceeds to step S705.

In step S705, a delta value of the accelerator pedal DQAPCS, which increases in accordance with the state of charge of the battery QBAT (having the same meaning as SOC), is retrieved from a table, and the operation proceeds to step S706. In step S706, the upper threshold APCSH and the lower threshold APCSL determined in step S700 are respectively reset to new values taking into account the delta value DQAPCS depending on the state of charge of the battery QBAT, and the operation proceeds to step S707.

In step S707, it is determined whether the cylinder deactivation prohibition flag F_APCS is "1". When the result of the determination is "YES", the operation proceeds to step S708, and when the result of the determination is "NO", the operation proceeds to step S713.

In step S708, it is determined whether a circumstance correction factor of the accelerator pedal APDRB is equal to or greater than the lower threshold APCSL. Note that the circumstance correction factor of the accelerator pedal APDRB is a correction factor for correcting the depression amount of the accelerator pedal taking into account acceleration performance of the vehicle. When the result of the determination is "YES" (i.e., APDRB≧APCSL), the operation proceeds to step S710, and when the result of the determination is "NO" (i.e., APDRB<APCSL), the operation proceeds to step S709. In step S709, the cylinder deactivation prohibition flag F_APCS is set to be "0", and the control operation is terminated.

In step S710, it is determined whether the circumstance correction factor of the accelerator pedal APDRB is equal to or less than the upper threshold APCSH. When the result of the determination is "YES", the operation proceeds to step S711, and when the result of the determination is "NO", the operation proceeds to step S712. In step S711, it is determined whether the timer value TAPS is "0". When it is determined in step S711 that the timer value TAPS is "0", the operation proceeds to step S709. When it is determined in step S711 that the timer value TAPS is not "0", the control operation is terminated. In step S712, the timer value TAPS is set to be a predetermined value (time) #TMAPS, and the control operation is terminated.

The timer value TAPS is provided in order to maintain prohibition of the cylinder deactivation operation, i.e., in order to postpone beginning of the cylinder deactivation operation until the predetermined time #TMAPS passes when the circumstance correction factor of the accelerator pedal APDRB is in a range between the lower threshold APCSL and the upper threshold APCSH.

In step S713, it is determined whether the circumstance correction factor of the accelerator pedal APDRB is equal to or greater than the upper threshold APCSH. When the result of the determination is "YES", the operation proceeds to step S714, and when the result of the determination is "NO", the control operation is terminated. In step S714, the cylinder deactivation prohibition flag F_APCS is set to be "1", and the control operation is terminated.

As is known in the prior art, in the vibration control mentioned above, the vibration of the engine is reduced in such a manner that the motor M is operated so as to produce torque having opposite phase with respect to engine torque so that engine torque is compensated for by the motor M. More specifically, control torque and phase are retrieved from a map depending on the revolution rate of the motor M (=the engine revolution rate NE) and an engine torque signal. In this case, the control torque may be applied while being gradually increased in order to prevent body vibration due to the control torque. Because the amount of energy output from the battery 3 increases as the amplitude for the vibration control is increased, the optimum amplitude may be set depending on the temperature of the battery 3 in order to warm the battery 3 up to a desired temperature.

According to the above configuration, when the engine E is in the all-cylinder operation state in which all six cylinders are operated, the warming control for the battery 3 may be executed using Joule heat that is generated during charging of the generated electrical energy generated by the motor M into the battery 3 due to the internal resistance of the battery 3. On the other hand, when the engine E is in the partial-cylinder operation state in which three cylinders are deactivated, the warming control for the battery 3 may be executed, without applying an excessive load to the engine E, using Joule heat that is generated during discharging energy from the battery 3 for operating the motor M so as to compensate for the engine torque with torque having opposite phase so that vibration of the engine E due to the partial-cylinder operation is reduced.

When the temperature of the battery 3 is equal to or lower than the predetermined value #TBATWAME (step S303), and the cylinder deactivation operation is being executed (step S307), the motor M is operated so as to compensate for dynamic imbalance of the engine E due to the cylinder deactivation operation and so as to reduce vibration of the engine E, and at the same time, the battery 3 can be warmed (step S308) using Joule heat which is generated during outputting electrical energy from the battery 3 due to the internal resistance of the battery 3; therefore, the battery 3 can be rapidly warmed without applying an excessive load to the engine E while reducing vibration of the engine E.

The warming control operation for the battery 3 by executing vibration control operation is performed only when the battery 3 is charged to some extent, i.e., when the battery 3 does not require an urgent charging (when it is determined in step S305 that the state of charge QBAT is greater than the lower limit of the state of charge for execution of vibration control #QBATWANV), and when the temperature of the battery device is not too low (when it is determined in step S306 that the temperature of the battery TBAT is higher than the lower limit temperature for execution of vibration control #TBATWANV); therefore, an appropriate control operation may be performed without loss in such a manner that loss of energy without recovery is avoided, which is encountered in the case in which the battery 3 that is in a substantially fully charged state is warmed by execution of power generation.

Because power generation is performed when the engine E runs in the all-cylinder operation state (step S307), i.e., when the engine E can sustain a considerable magnitude of load (step S313), whereby the battery 3 can be warmed using Joule heat due to the internal resistance of the battery 3, the battery 3 can be rapidly warmed, and the interior heater, which utilizes the heat of cooling water of the engine E which increases due to increased load for power generation, may also be used to warm the battery 3. As a result, both the cylinder deactivation control and the warming control for the battery can be made effective without sacrificing one or the other.

In addition, because it is possible to precisely determine whether the partial cylinder deactivation operation is permitted for the engine depending on at least one of the parameters including the temperature of cooling water of the engine (steps S602 and S501), a state of charge SOC of the battery 3 (steps S503, S606, and S704), and the temperature of the battery 3 (steps S504, S606, and S703), the degree of freedom of control may be increased.

Moreover, because the warming control for the battery can be executed while taking into account the upper threshold APCSH and the lower threshold APCSL that are determined depending on the depression amount of the accelerator pedal AP and the vehicle speed as shown in FIG. 10, the optimum warming control for the battery depending on the running state of the vehicle may be performed. In this case, because the zone for warming the battery by vibration control during a cylinder deactivation operation that is defined by the upper threshold APCSH and the lower threshold APCSL is set so as to expand as the vehicle speed increases, the zone for warming the battery by power generation is decreased as the vehicle speed increases, in which the amount of regeneration is possibly increased, whereby loss due to an excessive regeneration can be avoided.

Furthermore, based on the fact that the amount of energy output from the battery 3 is increased when a greater amplitude for the vibration control operation is set, the battery 3 can be warmed to a desired temperature by setting an optimum amplitude for the vibration control depending on the temperature of the battery 3 to be warmed.

The present invention is not limited to the above embodiment. For example, when a vibration control manner, in which different amplitudes are set depending on the temperature of the battery 3, is employed, and when the maximum amplitude is not sufficient for warming the battery 3, adjustment of the amplitude may be stopped.

Advantage Effects Obtainable by the Invention

As explained above, according to the control device for a hybrid vehicle of the present invention, when the temperature of the battery device is equal to or lower than a predetermined value and that the cylinder deactivation operation is being executed, the motor is operated so as to compensate for dynamic imbalance of the engine due to the cylinder deactivation operation and so as to reduce vibration of the engine, whereby it is possible to warm the battery device using Joule heat which is generated during outputting electrical energy from the battery device due to the internal resistance of the battery device. Therefore, the battery device can be rapidly warmed without applying an excessive load on the engine while reducing vibration of the engine.

According to another control device for a hybrid vehicle of the present invention, the warming control operation for the battery device by executing vibration control operation can be performed only when the battery device is charged to some extent, i.e., when the battery device does not require an urgent charging, and when the temperature of the battery device is not too low. Therefore, an appropriate control operation may be performed without loss in such a manner that loss of energy without recovery is avoided, which is encountered in the case in which the battery device that is in a substantially fully charged state is warmed by execution of power generation. As a result, both the cylinder deactivation control and the warming control for the battery can be made effective without sacrificing one or the other.

According to another control device for a hybrid vehicle of the present invention, because power generation is performed when the engine runs in the all-cylinder operation state, i.e., when the engine E can sustain a considerable magnitude of load, whereby the battery device can be warmed using Joule heat due to the internal resistance of the battery device, the battery device can be rapidly warmed, and a heater, which utilizes the heat of cooling water of the engine which increases due to increased load for power generation, may also be used to warm the battery device.

According to another control device for a hybrid vehicle of the present invention, because it is possible to precisely determine whether the partial cylinder deactivation operation is permitted for the engine depending on at least one of the parameters including the temperature of cooling water of the engine, a state of charge of the battery device, and the temperature of the battery device, the degree of freedom of control may be increased.

According to another control device for a hybrid vehicle of the present invention, because the warming control for the battery device can be executed while taking into account the running state of the vehicle that is determined depending on the depression amount of the accelerator pedal, the optimum warming control for the battery depending on the running state of the vehicle may be performed.

According to another control device for a hybrid vehicle of the present invention, based on the fact that the amount of energy output from the battery device is increased when a greater amplitude for the vibration control operation is set, the battery device can be warmed to a desired temperature by setting an optimum amplitude for the vibration control depending on the temperature of the battery device to be warmed.

What is claimed is:

1. A control device for a hybrid vehicle, the hybrid vehicle comprising an engine, which is adapted to allow a partial cylinder deactivation operation, a motor, which is capable of power generation, and driving wheels, the output power of at least one of the engine and the motor being transmitted to the driving wheels for driving the hybrid vehicle;

the control device comprising:

a battery device sending energy to and receiving energy from the motor;

a temperature measuring section for measuring the temperature of the battery device;

a control section which is adapted to execute a warming control operation for the battery device when the temperature of the battery device measured by the temperature measuring section is equal to or lower than a first predetermined value; and a determination section for determining whether the partial cylinder deactivation operation is permitted for the engine depending on the running state of the engine, wherein the control section is further adapted to execute a vibration control operation for the engine by operating the motor so as to reduce vibration of the engine when it is determined by the determination section that the partial cylinder deactivation operation is permitted for the engine, and to perform the warming control operation for the battery device by executing a vibration control operation for the engine.

2. A control device for a hybrid vehicle according to claim 1, wherein the warming control operation for the battery device by executing vibration control operation for the engine is performed only in the case in which a state of charge of the battery device is greater than a predetermined value, and the temperature of the battery device is higher than a second predetermined value.

3. A control device for a hybrid vehicle according to claim 1, wherein the control section is further adapted to operate the engine in an all-cylinder operation state when it is determined by the determination section that the partial cylinder deactivation operation is not permitted for the engine, and to perform the warming control operation for the battery device by charging the battery device with electrical energy generated by the motor.

4. A control device for a hybrid vehicle according to claim 1, wherein the determination section is adapted to determine whether the partial cylinder deactivation operation is permitted for the engine depending on one of the parameters including the temperature of cooling water of the engine, a state of charge of the battery device, and the temperature of the battery device.

5. A control device for a hybrid vehicle according to claim 1, wherein the determination section is adapted to determine whether the partial cylinder deactivation operation is permitted for the engine while containing a threshold value which is determined by a depression amount of an accelerator pedal and the vehicle speed.

6. A control device for a hybrid vehicle according to claim 1, wherein, when it is determined that the partial cylinder deactivation operation is permitted, and when the warming control operation for the battery device is performed by executing the vibration control operation, an amplitude for the vibration control operation is differently set depending on the temperature of the battery device.

7. A control device for a hybrid vehicle according to claim 6, wherein a greater amplitude for the vibration control operation is set when a greater increase in the temperature of the battery device is required.

* * * * *